UNITED STATES PATENT OFFICE.

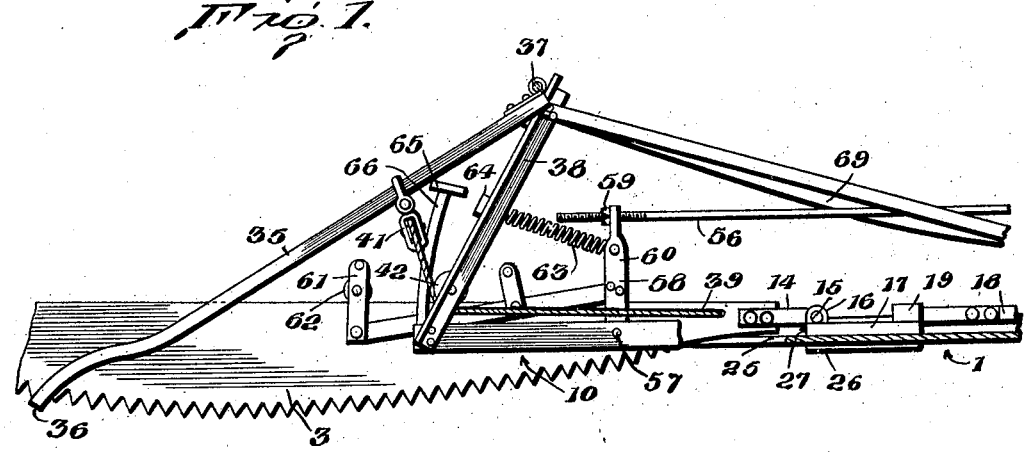
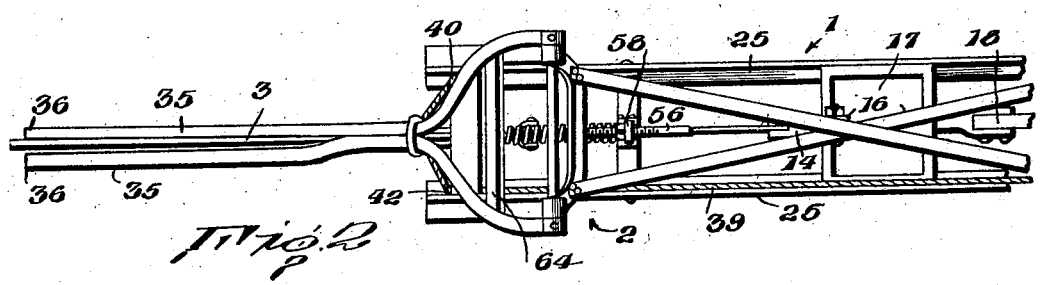
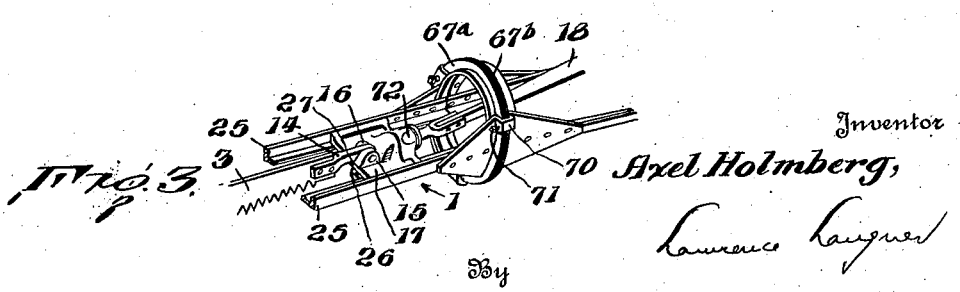

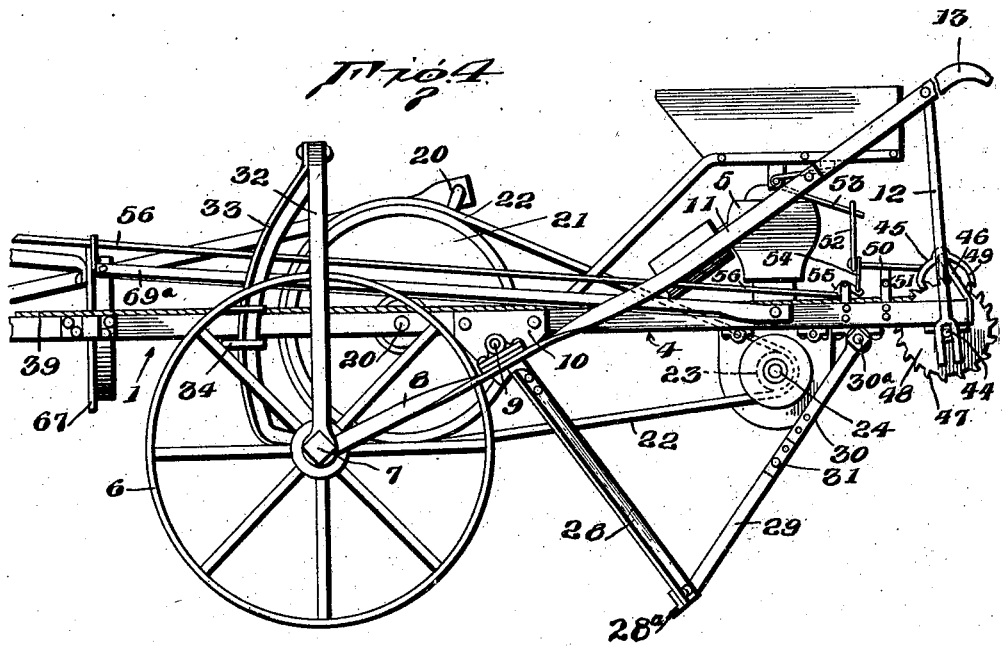
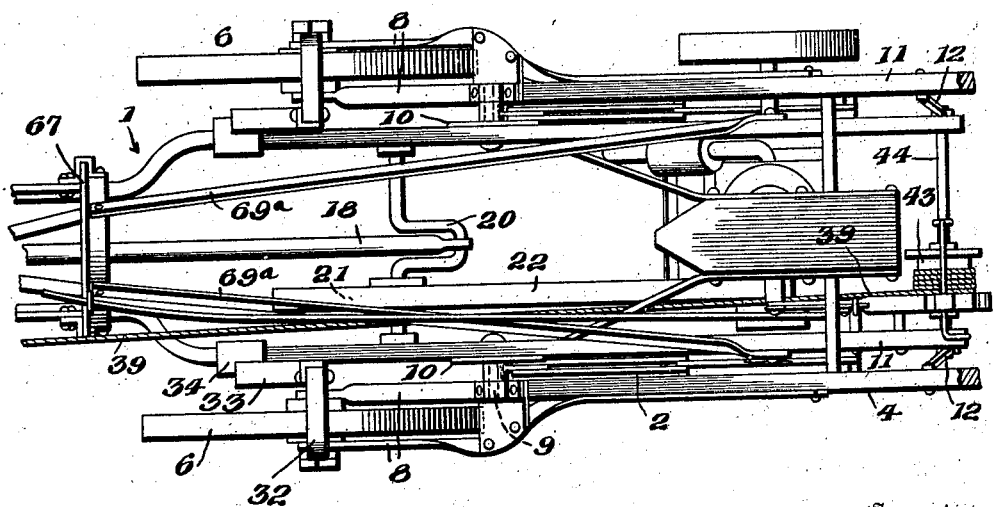

AXEL HOLMBERG, OF SOUTH ECKLIN, VIA TERANG, VICTORIA, AUSTRALIA.

PORTABLE POWER-DRIVEN CROSSCUT-SAW.

1,400,064.   Specification of Letters Patent.   Patented Dec. 13, 1921.

Application filed October 1, 1918. Serial No. 256,385.

*To all whom it may concern:*

Be it known that AXEL HOLMBERG, a subject of the King of Great Britain, and resident of South Ecklin, via Terang, in the State of Victoria and Commonwealth of Australia, has invented a certain new and useful Portable Power-Driven Crosscut-Saw, of which the following is a specification.

This invention relates to a portable wood saw operated by a convenient source of power, preferably by a motor mounted on the frame with the portable saw.

A feature of this invention is the provision of means and the arrangement of parts whereby the saw is maintained in a substantially horizontal plane during a vertical cut sawing operation and until the saw has completed the cut, this being automatically accomplished by said means.

Another feature of this invention is the provision of the saw, motor and operating mechanism on a portable frame provided with rear adjustable supporting legs to carry the weight of the frame and maintain the same substantially rigid during the sawing operation, the wheels of the frame being so mounted that they are adapted to be raised clear of the ground when not required for transportation purposes.

A further feature consists in pivoting the saw blade to a guide block to allow of limited freedom of movement.

Another feature is the provision of means whereby the saw may be shifted relative to the main body of the device to make a horizontal cut as in felling trees.

Other features and advantages will hereinafter appear.

In the accompanying drawings:

Figure 1 is a side elevation of the front portion of the device.

Fig. 2 is a top plan view of the parts shown in Fig. 1.

Fig. 3 is a detail perspective view showing one manner of connecting the forward portion to the rear portion of the frame.

Fig. 4 is a side elevation of the rear part of the device and is a continuation of the parts shown in Fig. 1.

Fig. 5 is a top plan view of the parts shown in Fig. 4 and is a continuation of the parts shown in Fig. 2.

As illustrated in the drawings the device of the present invention comprises a main frame 1 having at its forward end 2 the saw blade 3, and at its rear end 4 a motor 5, a driving connection between the saw blade and the motor 5 being provided as will hereinafter appear.

Located approximately in line with the center of gravity of the entire device there is provided a pair of wheels 6 each mounted on a stub shaft 7 carried by arms 8 pivoted on a pin 9 fixed to a bracket 10 secured to the frame 1. During transportation of the machine, the arms 8 carrying the wheels are held fixed to the frame by the rearward extending bars 11 which are held against movement relative to the frame by tie rods 12 having their lower ends fixed to a part on the frame. Thus, when the parts are in this position the machine may be easily balanced on the wheels 6 and may be pushed to the work to be done by means of handles 13 provided at the rear ends of the bars 11.

The saw blade 3 has fixed to its rear end an arm 14 pivotally mounted on a pin 15 in upstanding ears 16 on a cross head 17 which is mounted to slide in the frame 1 and which is reciprocated by a pitman 18 pivoted on the cross head at 19 and engaging at its rear end a crank shaft 20 mounted in the frame 1. The crank shaft is provided with a speed reducing pulley 21 fixed thereto which is connected to a belt 22 or other suitable driving connection with a pulley 23 on the drive shaft 24 of the motor 5. Hence, when the motor is operating the cross-head 17 and the saw-blade 3 are reciprocated in the usual natural manner of hand operated saws. The frame 1 comprises at its forward end 2 a pair of spaced angle bars 25, and it is on those bars 25 that the cross head is slidably mounted, the latter being held to the frame by a clip 26 secured to the cross head and underlying one of the angle bars 25. The saw blade is held elevated during transportation by the engagement of the arm 14 therefor with the forward end of the cross head as at 27.

During transportation, it has been stated, the frame has one point of support on the ground, namely, the wheels 6. But, preparatory to a sawing operation a change is made so that the device will have both a front and rear support so as to be rigid and to be firmly held to the work. For this purpose the arms 8 carrying the wheels 6 are pivoted on the pin 9 carried by the frame, whereby the wheels may be raised from the ground by the downward movement of the bars 11 after the tie rods 12 are released from their connection to the frame. Before this is done, however, a pair of rear legs 28, which are also pivoted in the pin 9, are swung down to engage the ground. Serving as a brace for the legs 28 and holding them in operative position are a pair of toggles, one for each leg, and each comprising a link 29 pivoted on the lower end of the leg 28 and a link 30 pivoted at 30ª to the frame 1, the link 29 being connected to the link 30 by a pin 31. The links 29 and 30 are held in extended "dead-center" position by a suitable engagement of the end of the link 30 with the channel portion of the link 29 with which it contacts. The legs 28 are connected by a cross tie 28ª to further insure rigidity and cause the legs to assume corresponding positions on the ground.

The stub shaft 7 for each wheel and the arm 8 therefor are further braced by a yoke comprising an outside member 32 and an inside member 33 rigidly connected at their upper ends and secured to the stub shaft 7 and arm 8 at their lower ends. Each of these yokes is guided in its up and down movement with the wheel by a guide 34 engaging the inside member 33 which is arcuate for the purpose, the arc of the member 33 being struck from the center of the pin 9 on which the yoke and the arms 8 rotate.

The forward end of the frame is supported on the log or other work in hand by a pair of arms 35 having the forward ends 36 in engagement with the work. The arms 35 at the rear ends are fixed to a shaft 37 rotatably mounted in a frame 38 extending upwardly, and as shown, rearwardly from the extreme forward end of the frame 1 being rigidly fixed to the angle bars 25 of the frame. The arms 35, as stated, are rotatably mounted on the frame but their position relative to the frame is adjusted and controlled by automatically operated mechanism for the purpose of maintaining the saw blade 3 substantially horizontal during a sawing operation, as will presently be described. At this point it should be noted that after the arms 35 are in engagement with the log and the legs 28 adjusted to proper position, the frame is firmly supported at the front and rear and that then the wheels can be raised from the ground with comparative ease. It should also be noted that the arms 35 are arranged to embrace the saw blade 3 thus serving to guide the saw blade while starting the cut through the log, hence insuring a straight and proper cut.

The forward part of the device is supported on the arms 35 by a cable or rope 39 having one end fixed to the frame 1 at 40 and passing over a pulley 41 carried by the arms 35 thence under a pulley 42 and from the latter to the rear of the device where it is wound on a drum 43 carried by a shaft 44 mounted in the frame 1. The drum contains a spring which counteracts substantially the entire downward force of the forward part of the frame against the arms 35 which force tends to cause the drum to rotate and pay-off the cable. This downward force is, however, slightly greater than the counter-acting force of the spring and therefore, the drum will rotate to pay-off the cable unless prevented by some means. This means in the present device comprises a dog 45 pivoted on a yoke 46 fixed to the frame and engaging teeth 47 on a wheel 48 fixed to the drum to rotate therewith.

By permitting the drum 43 to rotate and thus to pay-off the cable, the distance between the arms 35 and the frame at the points of connection of the cable may be increased, thus permitting the forward part of the frame to lower, pivoting on the ends of the legs 28 at the rear of the device. When this paying-off of the cable is properly controlled the rear end of the saw can be maintained at a proper level to insure that the saw blade, which is supported by the work, will be substantially horizontal during the entire cut.

To accomplish this the dog 45 for controlling the drum and the teeth 47 on the wheel 48 secured to the drum are made to form an escapement upon the operation of which the drum is permitted to move step-by-step, the dog 45 having for this purpose another dog 49 secured thereto. The escapement dog 45—49 is controlled by a lever 50 engaging the same and pivoted on the frame at 51, the lever 50 having an upwardly extending arm 52 engaging a spring 53 whereby the lever 50 normally tends to hold the dog 45 engaged with one of the teeth 47 of the wheel 48. Through a link 54 a bell-crank 55 and a forward extending rod 56, the escapement dog controlling lever 50 is connected with a controlling bell-crank 58 pivoted at 57 to the frame, there being an adjustable connection 59 between an upstanding arm 60 of the bell-crank 57 and the rod 56. At its forward end the bell-crank has pivoted a yoke 61 straddling the saw blade 3 and carrying a roller 62 engaging the upper edge of the saw blade, a spring 63 being provided between the arm 60 of the bell-crank and a cross bar 64 for holding the roller against the saw blade. The saw blade as usual has its cutting edge curved, and therefore as the saw blade is reciprocated by the cross head there is a rising and falling movement of the saw blade which is imparted to the roller 62 and bell-crank 57 carrying it. Thus, through the rod 56 and previosuly described connection, the escapement is intermittently operated to effect a step-by-step movement of the drum to permit the forward end of the frame to gradually drop as the cut in the log progresses. The arrangement is such that the operation of the bell-crank 57 and escapement for the drum causes the forward end 2 to drop an extent just equal to the increased depth of the cut in the log at each reciprocatory movement of the saw blade.

The arms 35 rest upon a support 65, in the form of a cross bar mounted on arms 66 extending upwardly from the frame 1, when the saw is being transported to the work.

The frame 1, as has been stated, comprises a forward part 2 and rear part 4, and these parts are joined at a hoop-like member 67 to which parts 2 and 4 are riveted. The hoop-like member 67 further serves as a brace for the entire frame, the forward part 2 having ties 69 secured to the frame 38 and to the hoop 67, and the rear frame 4 having ties 69$^a$ secured thereto at the rear and to the hoop.

In some cases it is desired to have the device so arranged that a cut may be made in a horizontal plane as when felling trees and for this purpose in some embodiments of this invention the hoop 67 is formed of two relatively movable parts 67$^a$ and 67$^b$, as shown in Fig. 3 the parts being held together by guides 70 and being fixed in adjusted position by clamping screws 71. This structure permits the forward part 2 and the rearward part 4 to be rotated at least 90°. The pitman 18 has a ball and socket connection 72 to the cross head 19 to permit this rotation without requiring any adjustment or change on the connections between the saw blade and the pitman operating the same.

The rods 12 for connecting the bars 11 to the frame during transportation is provided with a loop portion adapted to be slipped over the protruding portion of the shaft 44.

The spring 63 in addition to holding the bell crank to the saw blade exerts a comparatively slight downward pressure on the saw blade, holding the latter to the work.

I claim as my invention:

1. In a portable power-driven saw, the combination with a two-part frame; a saw blade carried by the front part of said frame; a motor carried by the rear part of the frame; means for connecting said motor to said saw blade, comprising a reciprocating block carried by the front part of the frame and a pitman carried by the rear part, means whereby the front part of the frame and the rear part of the frame may be angularly adjusted relatively to one another; means for securing the front and rear parts of the frame together in adjusted position; and a swivel joint connecting said reciprocating block and said pitman to permit said angular adjustment of said front frame with relation to the rear frame.

2. In a portable power-driven cross cut saw, the combination of a frame having guides therein; shiftable supporting wheels therefor; a saw blade, a power generator and an operating mechanism all mounted on the frame; supporting legs hinged to the frame; toggle links connecting the supporting legs to the frame; handle bars carried by the frame and connected to the axles of the supporting wheels to shift the same; guides mounted on the frame; and guide bars connected to the wheel axles and riding in said guides to guide the shifting movement of the wheels relative to the frame.

3. In a portable saw, the combination of a frame; supporting arms thereon; a power-driven cross cut saw blade; bars arranged to pass on either side of the saw blade to guide the same and hinged to said supporting arms; means for controlling said guide bars comprising a drum, a ratchet, a pawl and flexible connecting means from the said guide bars to the drum; a spring-controlled arm; and a roller carried by said spring-controlled arm adapted to bear against the top of the saw to keep it at working pressure.

4. In a portable power-driven cross cut saw, the combination of a frame; a block mounted to reciprocate in said frame; a saw blade pivoted to said block; a spring-controlled lever adapted to exert pressure on said blade; a winding drum; trip mechanism connecting said lever with said winding drum; pawl-and-ratchet release mechanism for said drum; a flexible connection extending around and from said drum and adapted to support and control the position of said frame; and a returning spring wound by the rotation of said drum.

5. In a portable power-driven cross cut saw, the combination of a saw blade pivotally supported at its rear end; and means for controlling the angle of the saw during the sawing operation comprising guide arms engaging the side of the saw blade, a winding drum, flexible connection from said drum to said guide arms, a pulley for guiding said flexible connection, a ratchet, a pawl for said ratchet, a spring-controlled arm engaging said pawl, a bell crank pivoted on a bracket on said frame, a link connecting said bell crank with said spring-controller arm, a spring, a bell crank, an arm connecting the last-named bell crank and spring, and a rod connecting the first-named bell crank and the last-named arm.

Signed at Melbourne, in the State of Victoria, Commonwealth of Australia, this 27th day of July 1918.

AXEL HOLMBERG.

Witnesses:
  A. EDWARDS,
  J. BOUSTIERE.